United States Patent
Roberts et al.

(10) Patent No.: US 8,060,653 B2
(45) Date of Patent: Nov. 15, 2011

(54) BACKGROUND SYNCHRONIZATION

(75) Inventors: Michael Patrick Roberts, St. Jacob's (CA); Eruc Giguere, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 980 days.

(21) Appl. No.: 11/790,038

(22) Filed: Apr. 23, 2007

(65) Prior Publication Data

US 2008/0263227 A1 Oct. 23, 2008

(51) Int. Cl.
*G06F 15/16* (2006.01)
(52) U.S. Cl. ......................... 709/248; 709/242
(58) Field of Classification Search .................. 709/242, 709/248
See application file for complete search history.

(56) References Cited

U.S. PATENT DOCUMENTS

| | | | | |
|---|---|---|---|---|
| 5,719,854 A * | 2/1998 | Choudhury et al. | ........... | 370/231 |
| 5,826,253 A * | 10/1998 | Bredenberg | ........................ | 1/1 |
| 6,330,582 B1 * | 12/2001 | Kuo et al. | ........................ | 718/101 |
| 6,477,543 B1 * | 11/2002 | Huang et al. | ................... | 707/200 |
| 6,553,409 B1 * | 4/2003 | Zhang et al. | ................... | 709/213 |
| 6,742,033 B1 * | 5/2004 | Smith et al. | ................... | 709/224 |
| 6,976,077 B1 | 12/2005 | Lehew et al. | | |
| 7,133,927 B2 * | 11/2006 | Guo et al. | ..................... | 709/234 |
| 7,440,416 B2 * | 10/2008 | Mahany et al. | ............... | 370/254 |
| 2003/0058881 A1 | 3/2003 | Wu et al. | | |
| 2004/0109436 A1 * | 6/2004 | Vargas et al. | .................. | 370/350 |
| 2005/0043060 A1 * | 2/2005 | Brandenberg et al. | ........ | 455/558 |

OTHER PUBLICATIONS

Cerami, Ethan. *Delivering Push*. New York: McGraw-Hill, 1998.
International Search Report dated Aug. 20, 2008 for PCT/US08/05150.

* cited by examiner

*Primary Examiner* — Asad M Nawaz
*Assistant Examiner* — Marie Georges Henry
(74) *Attorney, Agent, or Firm* — Sterne, Kessler, Goldstein & Fox P.L.L.C.

(57) ABSTRACT

Systems, methods and computer program products for determining a schedule for synchronizing a server and a client are described herein. The method operates by tracking user usage of the client to develop usage patterns. A sync schedule is generated using the usage patterns, where the sync schedule enhances at least one of sync usefulness and sync transparency. The server and client are synchronized according to the sync schedule. More particularly, a sync fitness measure for an interval t is determined. The sync fitness measure is based on at least one of (a) sync transparency; and (b) sync usefulness. It is determined whether the sync fitness measure satisfies a threshold. If the sync fitness measure satisfies the threshold, then the server and client are synchronized during interval t.

9 Claims, 12 Drawing Sheets

ADAPTIVE BACKGROUND SYNC PROCESS
402

TRACK USAGE OF CLIENT AND DEVELOP USAGE PATTERNS —404

406
DETERMINE TIME/INTERVAL FOR SYNC TO PROVIDE UP-TO-DATE CONTENT WHILE MAINTAINING SYNC TRANSPARENCY (REDUCE SYNC VISIBILITY) —408

SYNC ACCORDING TO ADAPTIVE SYNC SCHEDULE —410

$$E_1(t) = \alpha_1 \cdot \left(1 - \frac{\|t-t_1\|}{\text{maxtime}}\right) - \alpha_2 \cdot \sum_{i=t_0}^{t-1} P_U(i)$$

FIG. 6

$$t_1 = \min\{j\} : P_U(j) > \beta$$

$$E(t) = \gamma_1 \cdot E_1(t) + \gamma_2 \cdot E_2(t)$$

FIG. 9

BACKGROUND SYNCHRONIZATION

BACKGROUND OF THE INVENTION

1. Field of the Invention

The present invention is generally directed to synchronization between clients and servers in a computing environment.

2. Background Art

FIG. 1 illustrates a computing environment 102 that includes a server 104 and a client 106 which communication via any known means, such as the Internet 110 (in practice, a plurality of servers 104 and clients 106 may operate in the computing environment 102). From time to time, client 106 synchronizes its state (data, applications, etc.) with server 104.

For example, according to the AVANTGO service (www.avantgo.com) available from iAnywhere Solutions, Inc., a Sybase company, client 106 receives content from one or more web sites 108 when it syncs with server 104. More particularly, server 104 retrieves data from web sites 108 corresponding to channels to which client 106 is subscribed. During a sync operation, server 104 transfers such data to client 106 via the Internet 110. (In an embodiment, as shown in the example of FIG. 1, server 104 and web sites 108 communicate with each other, and the client 106 and the server 104 communicate with each other, but the client 106 does not directly communicate with web sites 108. Instead, client 106 receives content from web sites 108 via server 104.)

In the past, sync operations usually took place when the client 106 was in a cradle connected to a computer via a wired connection, which was in turn connected to the Internet 110 via another wired connection.

Now, a multitude of well known client devices exist with functionality to wirelessly connect to the Internet. With such client devices, synchronizations can occur at any time.

Synchronization operations demand substantial computer and network resources, and often require a non-trivial amount of time to complete. A user's experience is diminished if a sync occurs while the user is trying to use the client device.

Also, by definition, synchronizations are performed to provide the user with up-to-date information when he is using the client device. The usefulness of a sync is diminished if the period between when the sync is performed, and when the user next uses the client device, is great.

Accordingly, what are needed are improved approaches for performing syncs between clients and servers.

BRIEF SUMMARY OF THE INVENTION

The present invention is directed to systems, methods and computer program products for determining a schedule for synchronizing a server and a client.

In an embodiment, the invention operates by tracking user usage of the client to develop usage patterns. A sync schedule is generated using the usage patterns, where the sync schedule enhances at least one of sync usefulness and sync transparency. The server and client are synchronized according to the sync schedule.

More particularly, the invention determines a sync fitness measure for an interval t. The sync fitness measure is based on at least one of (a) sync transparency; and (b) sync usefulness. The invention determines whether the sync fitness measure satisfies a threshold. If the sync fitness measure satisfies the threshold, then the server and client are synchronized during interval t.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 6-9 are expressions for generating a sync fitness measure that is used in the adaptive sync process for determining whether a sync should take place in a given time interval, according to an embodiment of the invention.

Figure 1:
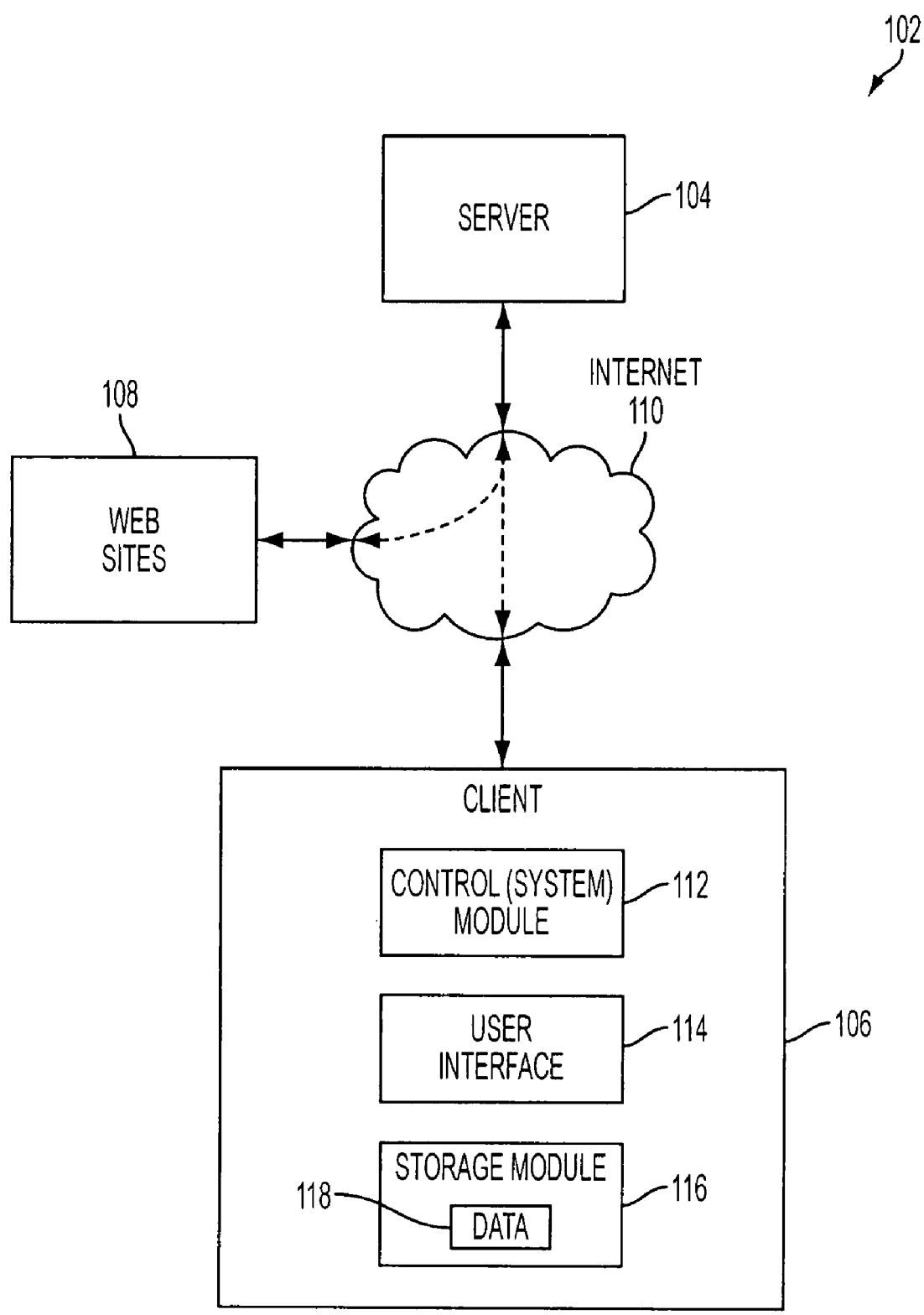
FIG. 1 illustrates an example computing environment according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview of the Invention

The present invention is directed to systems, methods and computer program products for synchronizing a client with a server such that (1) the sync is transparent to the user; and (2) usefulness of the sync is enhanced.

The invention shall be described with reference to the example computing environment 102 shown in FIG. 1, which is provided solely for purposes of illustration, and not limitation. Computing environment 102 includes a server 104 and a client 106, which are connected via any known means, such as but not limited to the Internet 110. Although only a single server 104 and client 106 are shown in FIG. 1, in practice computing environment 102 may include any number of servers 104 and clients 106.

According to an embodiment, client 106 includes a control (or system) module 112, a user interface 114 and a storage module 116. The storage module 116 includes data 118. It is noted that data 118 may represent information, applications, graphics, video, audio or any other object capable of being stored in a computer useable medium.

In an embodiment, during a sync, server 104 transmits information from websites 108 to client 106. Such websites 108 correspond to channels to which client 106 is subscribed. The information is stored in storage module 116 (represented as data 118). Thereafter, a user of client 106 can access data 118 via user interface 114 to surf such channels in an off-line browsing mode. Such functionality is provided by the AVANTGO service (www.avantgo.com) available from iAnywhere Solutions, Inc., a Sybase company. It is noted that the invention is not limited to this example AVANTGO embodiment. Instead, the invention is applicable to any client/server syncing of any type of data from any source.

According to the invention, syncs between client 106 and server 104 are scheduled so as to enhance a user's experience while working with client 106. In particular, syncs are scheduled to enhance either or both of the following factors: (1) sync transparency; and (2) sync usefulness.

Figure 2:
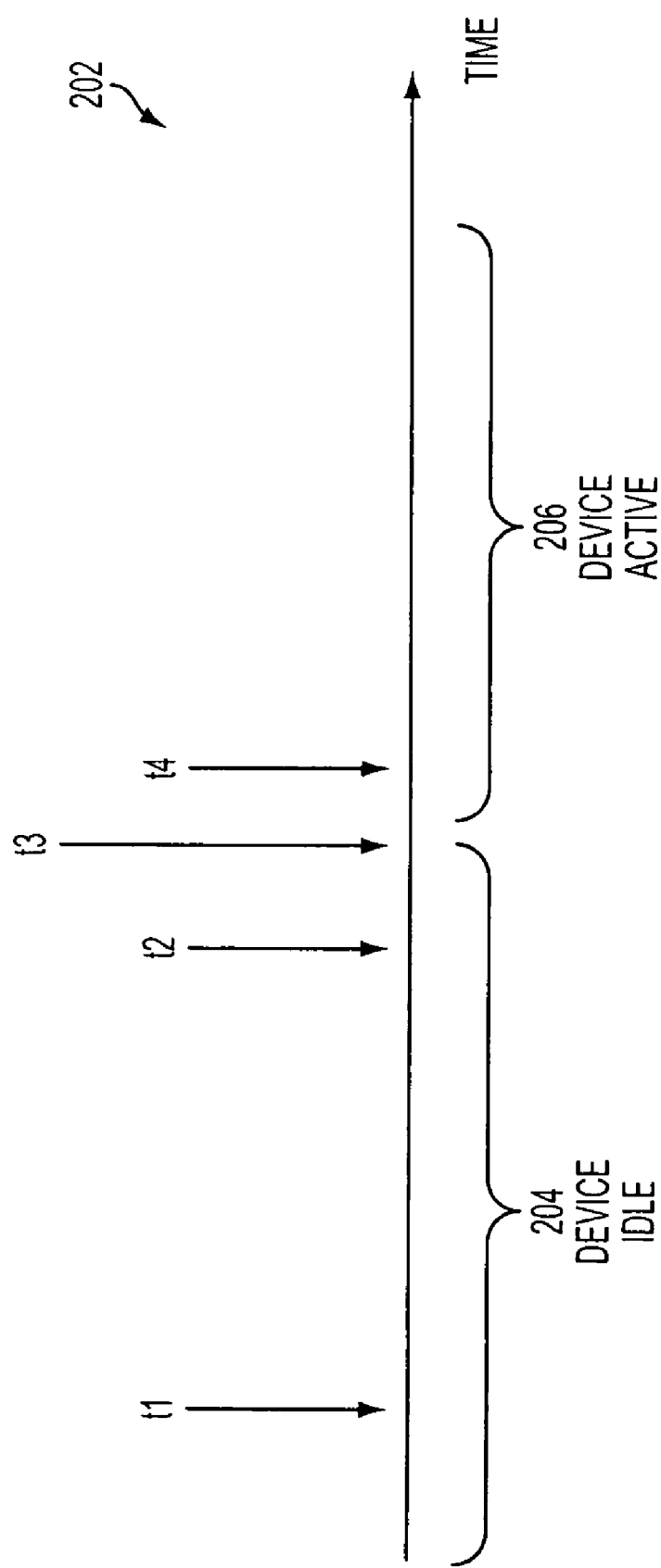
FIG. 2 is an example timeline used to illustrate issues associated with synchronizing a client with a server.

Sync transparency is directed to reducing the impact of the sync on the user. Consider the example timeline 202 shown in FIG. 2. Period 204 denotes a period during which the client 106 is inactive. In other words, period 204 is a period during which client 106 is not being used by the user (for example, the client 106 may be holstered). Period 206 denotes a period during which the client 106 is active. In other words, during period 206, the user is using the client 106. Or, more particularly in some embodiments, during period 206, the user is accessing data 118 in client 106 via user interface 114. Other definitions/implementations of active/inactive will be apparent to persons skilled in the relevant art, and are within the scope and spirit of the present invention. For example, in an embodiment, active/inactive may depend on whether a particular application is being used in client 106.

According to embodiments of the invention, it is preferred to perform the sync while the client 106 is inactive (i.e., during period 204). Thus, it is preferred to perform the sync at times t1 or t2. By performing the sync in the background, the sync is not visible to the user. In other words, the sync is transparent to the user. In contrast, if the sync is performed while the client 106 is active, such as at time t4, then the sync will interfere with the user's work as it will negatively impact the performance of client 106.

Sync usefulness is directed to scheduling the sync so as to better ensure that the data 118 is current when the user next wishes to access the data 118 via user interface 114 or some other means. Consider again the example timeline 202 in FIG. 2. According to embodiments of the invention, it is better to perform the sync at time t2, as opposed to time t1. By doing so, the data 118 is more up-to-date when the user next wishes to access the data 118 at time t3.

For the same reason, it might be useful to perform the sync at time t4. In other words, to provide the user with the most up-to-date information, it might be useful to perform the sync during the period 206 that the client 106 is active. However, doing so would make the sync visible to the user and would, therefore, negatively impact the user's experience while working with client 106. Embodiments of the invention consider these factors when scheduling when syncs should occur.

2. Scheduled Synchronization Embodiment

Figure 3:
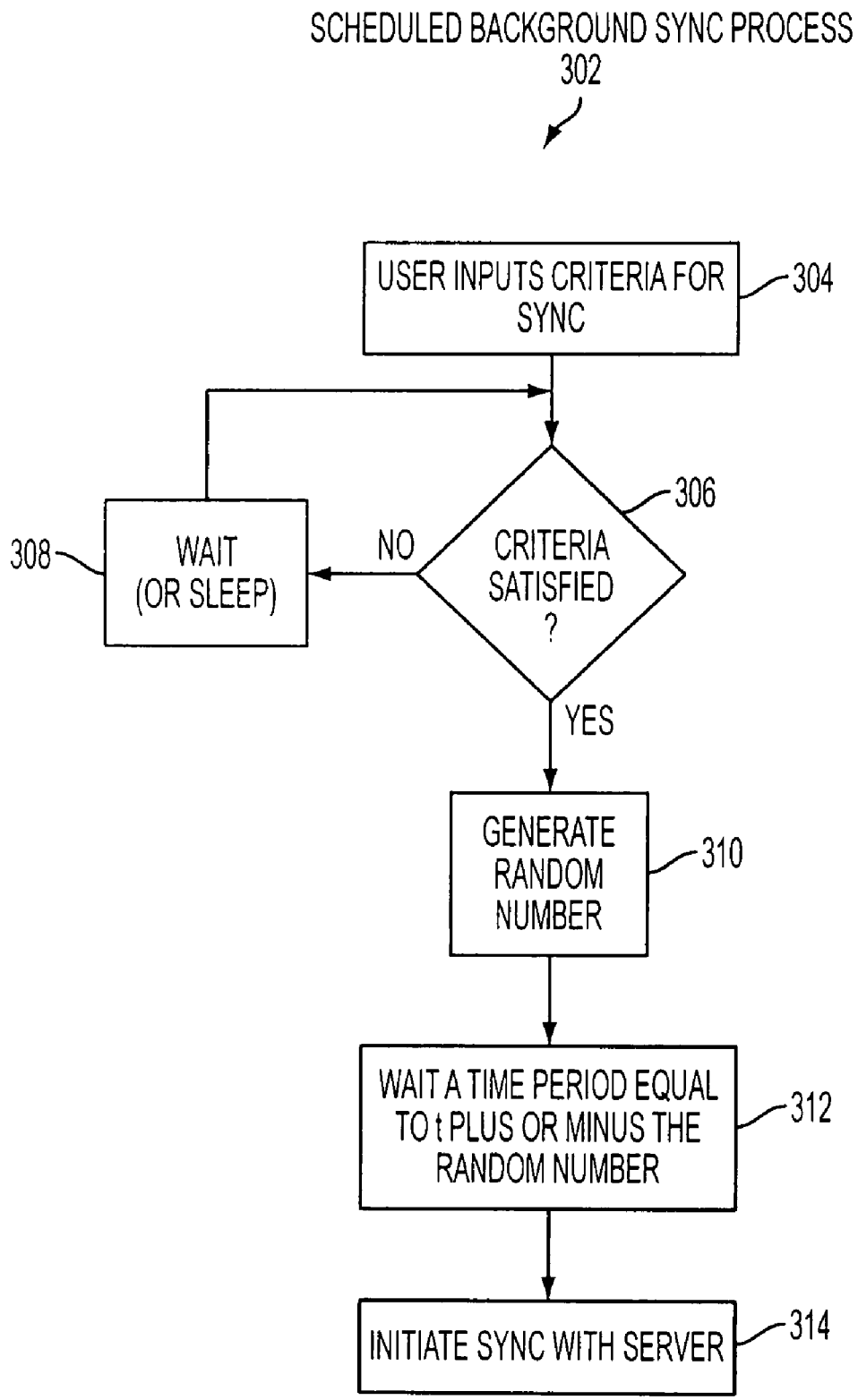
FIG. 3 is a flowchart representing a scheduled sync process according to an embodiment of the invention.

FIG. 3 illustrates a flowchart 302 representing a scheduled synchronization process according to an embodiment of the invention.

In step 304, the user enters criteria for the sync. Such criteria defines when syncs are to take place. For example, criteria may be "Sync at 8 am every day," or "Sync when the device has been idle for 1 hour." Other such criteria will be apparent to persons skilled in the relevant art(s) based on the teachings contained herein.

In step 306, control module 112 of client 106 determines whether the criteria is satisfied. If not, then in step 308 control module 112 waits and, after a predetermined time period (the length of which is implementation dependent), returns to step 306.

Otherwise, if it is determined in step 306 that the criteria is satisfied, then step 310 is performed. In step 310, control module 112 generates a random number.

In step 312, control module 112 waits for a time period equal to t plus or minus the random number. The value of t is implementation dependent, and in embodiments may be set by the user or administrator. Whether the random number is added or subtracted from t is also implementation dependent. After the time period elapses, step 314 is performed.

In step 314, control module 112 initiates a sync between the client 106 and the server 104.

It is noted that steps 310 and 312 are optional. The purpose of steps 310 and 312 is to prevent a large number of clients 106 from attempting to sync with server 104 at the same time (this could negatively impact network and server performance). By waiting some time period that is set using a random number, it is possible to stagger in time syncs with a great number of clients 106, thereby enhancing network and server performance.

3. Adaptive Synchronization Embodiment

Figure 4:
FIG. 4 is a flowchart representing an adaptive sync process according to an embodiment of the invention.

FIG. 4 illustrates a flowchart 402 representing an adaptive synchronization process according to an embodiment of the invention.

According to the adaptive synchronization process 402, the client 106 automatically and intelligently schedules syncs with the server 104. Benefits include:

A simplified user experience which adapts a schedule without requiring user intervention.

Reduced visibility of synchronizations, meaning the user will not see the length of time associated with synchronizations.

Enhanced sync usefulness, meaning the data 118 will be more up-to-date when the user next wishes to access the data 118 on the client 106.

The adaptive synchronization process 402 tracks user actions to develop patterns which can be expected to govern the actions of a user at a later time. Using the patterns that have been observed over time, the best interval for synchronization is chosen. The adaptive synchronization process 402 tracks (1) the probability that the client device 106 will be active or inactive in a given interval; and (2) the probability that the user will access the data 118 in client 106 in a given interval. The two probabilities, when tracked, provide sufficient information to determine a fitness measure for each interval. This measure determines whether synchronization in a given interval would be useful and whether it would be unlikely to be seen by the user.

Referring now to FIG. 4, in step 404 the control module 112 tracks user usage of client 106, and develops usage patterns. In particular, control module 112 tracks when client device 106 is inactive (i.e., not being used at all by user, such as when it is holstered), and active (i.e., when it is being used by user, or might be being used by user, such as when it is not holstered). Also, control module 112 tracks when the user is accessing data 118 via user interface 114 or some other means. Well known client devices, such as but not limited to BLACKBERRIES, PALM devices and POCKETPC devices, provide well known interfaces for tracking such activities.

With such usage information, control module 112 determines the probability $P_H$ that the client 106 is holstered (i.e., inactive) in any given interval during the day, and the probability $P_U$ that the user will be accessing data 118 in any given interval during the day. In an embodiment, each interval is 15 minutes, and accordingly there are 96 intervals each day. In an embodiment, intervals are numbered from 0 to 95, or 1 to 96. Embodiments for determining $P_H$ and $P_U$ are described below in Section 5.

In step 408, control module 112 determines a schedule for synchronizing client 106 with server 104 such that (1) the sync is transparent to the user; and (2) usefulness of the sync is enhanced. In embodiments, factor (1) is given more weight than factor (2), or vice versa. In embodiments, only factor (1) is considered. In other embodiments, only factor (2) is considered.

In step 410, syncs are performed according to the schedule developed in step 408.

Figure 5:
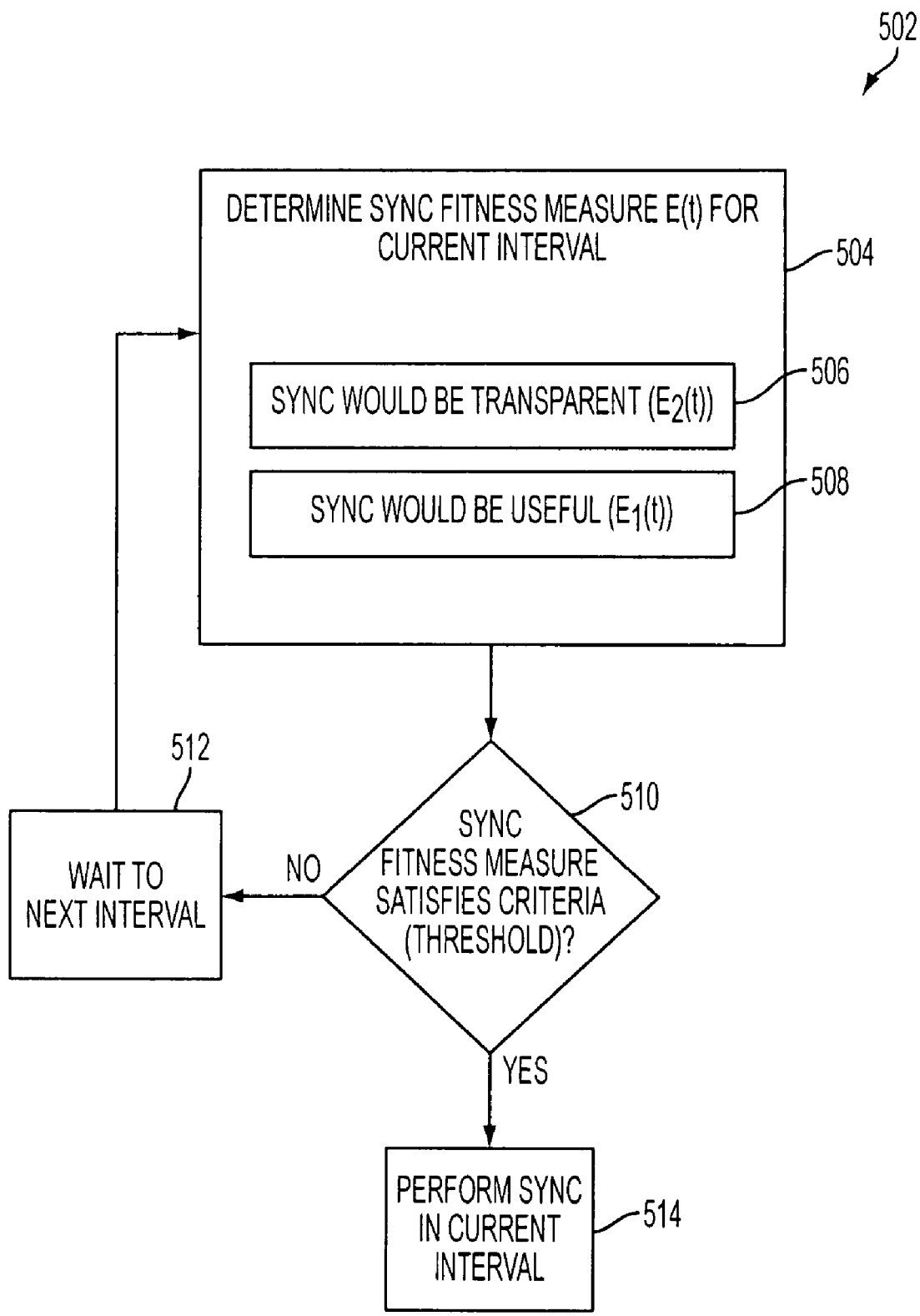
FIG. 5 is a flowchart illustrating functional details of the adaptive sync process, according to an embodiment of the invention.

An embodiment for performing steps 408 and 410 (collectively indicated as 406 in FIG. 4) shall now be described with reference to flowchart 502 in FIG. 5.

In step 504, control module 112 determines the sync fitness measure $E(t)$ for the current time interval. The sync fitness measure $E(t)$ is an indication of whether the sync should be performed in the current time interval. The larger $E(t)$ is, the greater the likelihood that a sync will occur during the current time interval.

An embodiment for generating the sync fitness measure $E(t)$ is described below in Section 4.

In step 510, control module 112 determines whether the sync fitness measure $E(t)$ is greater than or equal to a threshold. The value of the threshold is implementation dependent, and in embodiments may be user or administrator adjustable.

If the sync fitness measure $E(t)$ is not greater than or equal to the threshold, then the control module 112 in step 512 waits for the next time interval, at which time it will return to step 504.

If the sync fitness measure $E(t)$ is greater than or equal to the threshold, then step 514 is performed. In step 514, control module 112 initiates a sync between client 106 and server 104.

4. Embodiments for Generating the Sync Fitness Measure $E(t)$

In an embodiment, the sync fitness measure $E(t)$ is based on two factors: (1) how useful an update in the current interval will be to the user (sync usefulness; see 508 in FIG. 5); and (2) how likely it is that a sync in the current interval will not disturb the user (sync transparency; see 506 in FIG. 5).

The first factor is represented as $E_1(t)$, an embodiment of which is shown in FIG. 6. $E_1(t)$ has a first component 604 and a second component 606.

The first component 604 is a representation of how old the data 118 will be when it is next accessed by the user of client 106. In essence, the first component 604 is a measure of the length of time between the current interval and the closest next interval of major usage of the data 118 by the user.

In FIG. 6, $t$ is the current interval, and $t_1$ is the closest (in time) next interval of major usage of the data 118 by the user. $MAX_{time}$ is equal to the number of intervals in a day. In an embodiment, $MAX_{time}$ is equal to 96, and the intervals are numbered from 0 to 95 or 1 to 96. Thus, $t$, $t_1$, etc., are each equal to 0 to 95 or 1 to 96, depending on the numbering scheme used.

If the difference $t-t_1$ is small, then the time period between the current interval and the next interval of major data usage is small. Accordingly, if the difference $t-t_1$ is small, then it would be useful to sync during the current interval, since it is likely that the user will soon be accessing the data 118 via user interface 114 (thus, the data 118 will be current when it is accessed by the user if the sync took place during the current interval). This is reflected in the first component 604 of FIG. 6, where the absolute value of difference $t-t_1$ is divided by $MAX_{time}$, and then this normalized value is subtracted from 1.

In contrast, if the difference $t-t_1$ is large, then the time period between the current interval and the next interval of major data usage is great. Accordingly, if the difference $t-t_1$ is large, then it would not be useful to sync during the current interval, since it is not likely that the user will soon be accessing the data 118 via user interface 114 (thus, the data 118 will be old when it is accessed by the user if the sync took place during the current interval).

FIG. 7 illustrates an embodiment for calculating $t_1$, which as noted above is equal to the closest (in time) next interval of major usage of the data 118 by the user. $P_U(j)$ is the probability that data 118 will be accessed by the user via user interface 114 during interval $j$. According to the expression 702 in FIG. 7, the interval that has a usage probability $P_U$ greater than a threshold $\beta$, and that is closest in time to the current interval (determined using the minimum, or min, function) is identified and returned as $t_1$.

Referring again to FIG. 6, the second component 606 of $E_1(t)$ is a representation of how usefulness is being lost in delaying the sync. Lost usefulness is determined by summing the usage probabilities $P_U$ for the intervals from $t_0$ (the last interval where a sync took place) to just before the current interval (i.e., interval $t-1$). The second component 606 is subtracted from the first component 604 to form $E_1(t)$. Thus, the greater the second component 606 (that is, the more usefulness was lost by delaying the sync to the current interval), the less likely the sync will take place in the current interval. The second component 606 acts to balance the first 604 by making it less likely to sync if too much usage has been missed by not syncing earlier. This helps to push syncs forward and away from intervals when the user is actually using the client 106.

As indicated in FIG. 6, $\alpha_1$ and $\alpha_2$ are weights to control the importance of the two components 604 and 606.

Figure 8:

FIG. 8 illustrates an expression 802 corresponding to the second factor $E_2(t)$ upon which $E(t)$ is based, specifically, how likely it is that a sync in the current interval will not disturb the user's use of the client 106 (sync transparency). This expression 802 acts to ensure that syncs are more likely to occur in the intervals when the user does not need to use the client 106. Accordingly, $E_2(t)$ is equal to the probability that the client 106 will be inactive (for example, holstered) during the current interval $t$.

Figure 9:
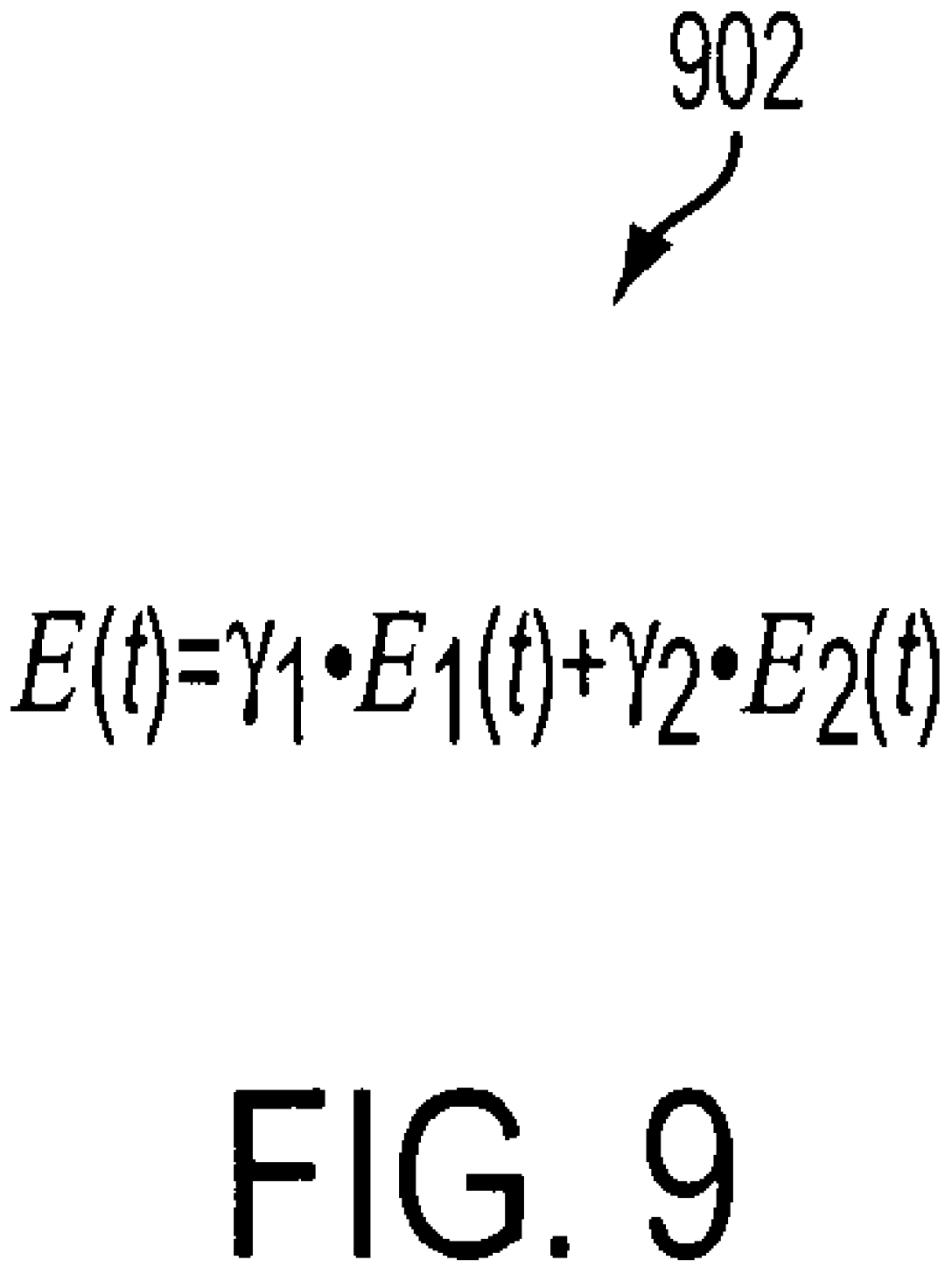

The sync fitness measure $E(t)$ is represented by expression 902 in FIG. 9, and is the weighted sum of $E_1(t)$ and $E_2(t)$. The weights enable these factors to be emphasized or de-emphasized in an implementation dependent manner.

As noted above, the larger $E(t)$ is, the greater the likelihood that a sync will occur during the current time interval. Specifically, if $E(t)$ of the current interval is greater than or equal to a threshold, then the sync is performed in the current interval (see steps 510 and 514 of FIG. 5).

5. Embodiments for Determining $P_H(t)$ and $P_U(t)$

As described above, $P_H(t)$ is the probability that the client 106 will be inactive (holstered or otherwise inactive) during interval $t$. $P_U(t)$ is the probability that the user will be accessing the data 118 in the client 106 during interval $t$.

$P_H(t)$ and $P_U(t)$ can be determined by control module 112 in a number of ways. For example, an averaging method can be used to determine $P_H(t)$ and $P_U(t)$. A number of averaging methods exist. According to one approach, the control module 112 collects samples during each interval for a number of days. Assume, for example, that during interval 25, the client 112 was inactive 8 out of 10 days. According to this approach, $P_H(25)$ would be equal to 80%. Also assume, for example, that during interval 25 and for those same 10 days, the user had accessed data 118 in client 106 only once. Accordingly, $P_U(25)$ would be equal to 10%. $P_H(t)$ and $P_U(t)$ could be adjusted each day according to that day's samples.

There are many other approaches for determining $P_H(t)$ and $P_U(t)$, many of which are well known, and the scope of the present invention includes all of those well known approaches.

Additional approaches are also within the scope and spirit of the present invention. A novel and unobvious embodiment of the invention for generating $P_H(t)$ and $P_U(t)$ shall now be described.

5.1 Probability Estimation

According to an embodiment, an adaptive algorithm is used to generate $P_H(t)$ and $P_U(t)$.

The goal of many adaptive algorithms is to evolve a specific solution over time. Preferably, any adaptive algorithm used with the present invention should also converge over time. With such adaptive algorithm the same kind of annealing that is commonly used is not directly applicable since usage patterns can change with time and the estimates ($P_H(t)$ and $P_U(t)$) are expected to change with them. Annealing is still partially applicable with the invention since it acts to add noise resistance to the data which naturally is highly volatile. For these reasons, the algorithm will preferably employ a kind of partial annealing to harden the estimation when it is undergoing stochastic noise and loosen when it observes changes in patterns which are reinforced over multiple observations. According to an embodiment, a recurrence relation, $\Delta_{n,t}$, is used to control the proportion of the observed probability that will be integrated into the estimation. This relation is defined as $$\Delta_{n,t} = \omega \Delta_{n-1,t} + (1-\omega)(\mathbb{P}^*(t) + \mathbb{P}_{n-1}(t)),$$

where P*(t) represents the observed probability, $P_n(t)$ represents the probability estimation for iteration n and $0 \leq \omega \leq 1$ is a scaling factor. Using this $\Delta$-factor the probability estimate $P_n(t)$ is updated as $$\mathbb{P}_n(t) = |\Delta_{n,t}| \mathbb{P}^*(t) + (1 - |\Delta_{n,t}|) \mathbb{P}_{n-1}(t).$$

Figure 10:
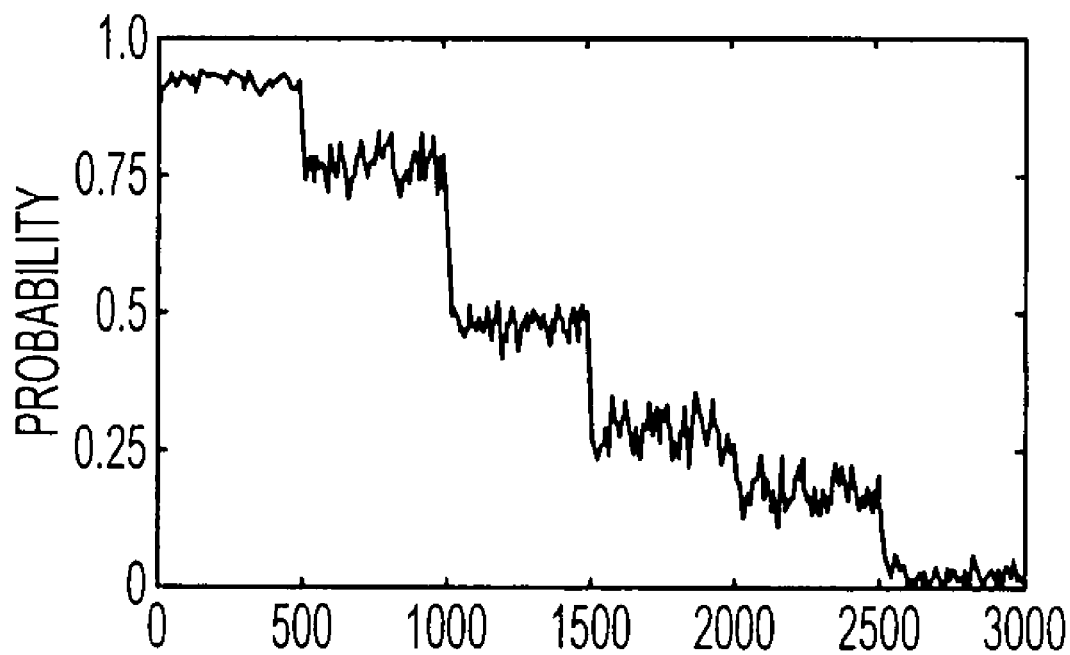
FIGS. 10-12 are graphs illustrating advantages in using adaptive algorithms to generate $P_H(t)$ (probability that a client will be inactive at time t) and $P_U(t)$ (probability that a user will be accessing data in a client at time t), according to an embodiment of the invention.

Using this definition of $\Delta_n$ significantly improves the resistance of the estimation to the noisy data, as can be seen in FIG. 10, while still being able to adapt quickly to the behavioral changes in the data.

The advantages of this adaptive algorithm are apparent when compared with an averaging method over a short interval. Firstly, the adaptive scheduling method needs to store information for two or more intervals per hour to allow it to be effective while an average-based method would need to store more information about the series of previous observations to obtain similar results.

An averaging method also lacks the ability to dampen the noise to the extent demonstrated by the adaptive algorithm. Averaging methods are also slower in adaptation for comparable noise reduction, requiring around ten-times the number of observations required to adapt using the adaptive algorithm.

5.2 Improving Estimation

The $\Delta$-factor described above still contains a high level of variability. This is due in part to the fact that small and large changes are treated linearly. Since small changes can vary the estimation of $P_H(t)$ and $P_U(t)$ widely, the adaptive algorithm in an alternative embodiment includes a method of exaggerating the differences between small and large changes, to lessen the impact of smaller changes which can accumulate over time and introduce large amounts of noise in the estimate. Using the square of the $\Delta$-factor as the update rate decreases, the impact of small variations has the added problem of making the estimation very slow to respond to legitimate behavioral changes. This new update rate, $\Delta^*_{n,t}$ is defined as $$\Delta^*_{n,t} = sgn(\Delta_{n,t}) \cdot \Delta_{n,t},$$

where sgn(•) denotes the sign of the term. It is important to note that without the sgn-term variability would compound and the update rate would quickly saturate at the maximum and cause the estimation to fluctuate significantly.

Figure 11:
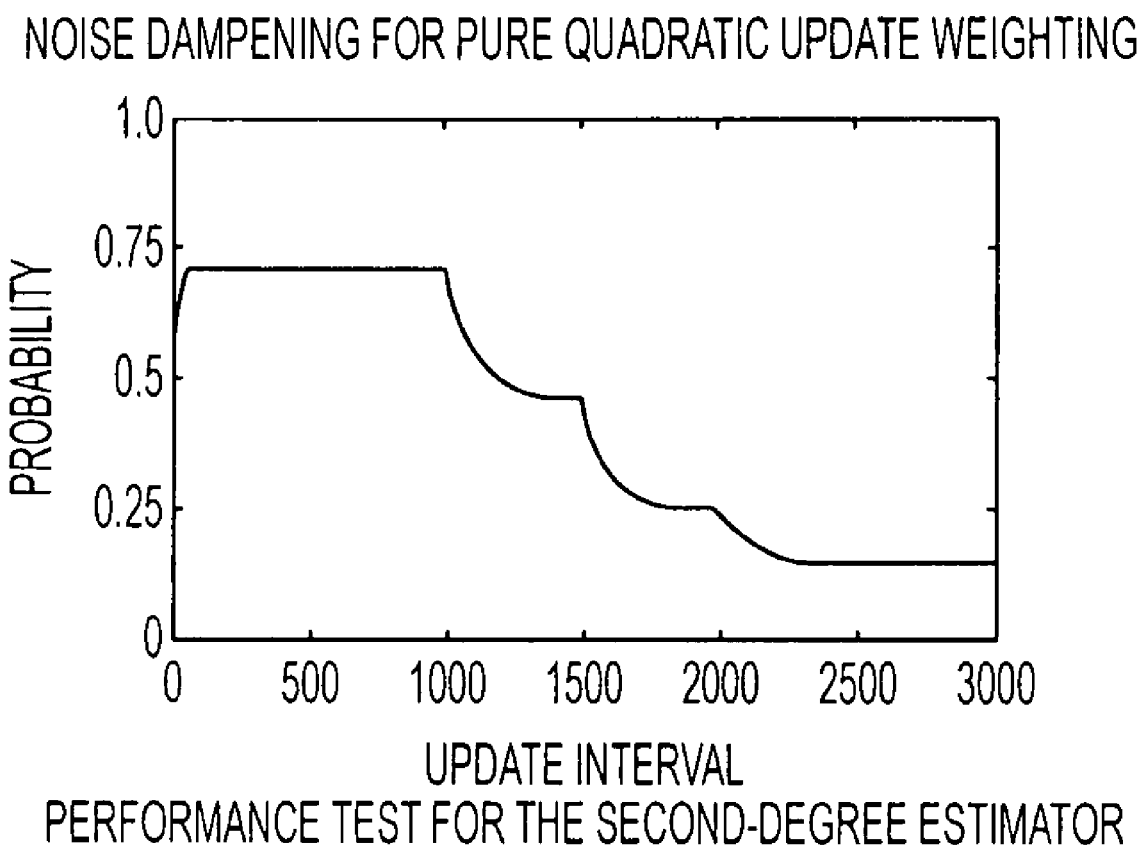

As can be seen in FIG. 11, the quadratic term significantly improves the noise dampening capabilities of this embodiment, but improvement is still possible. By using a combination of the linear and quadratic equations, a better estimator can be created which borrows characteristics from both $\Delta$-factors.

Figure 12:
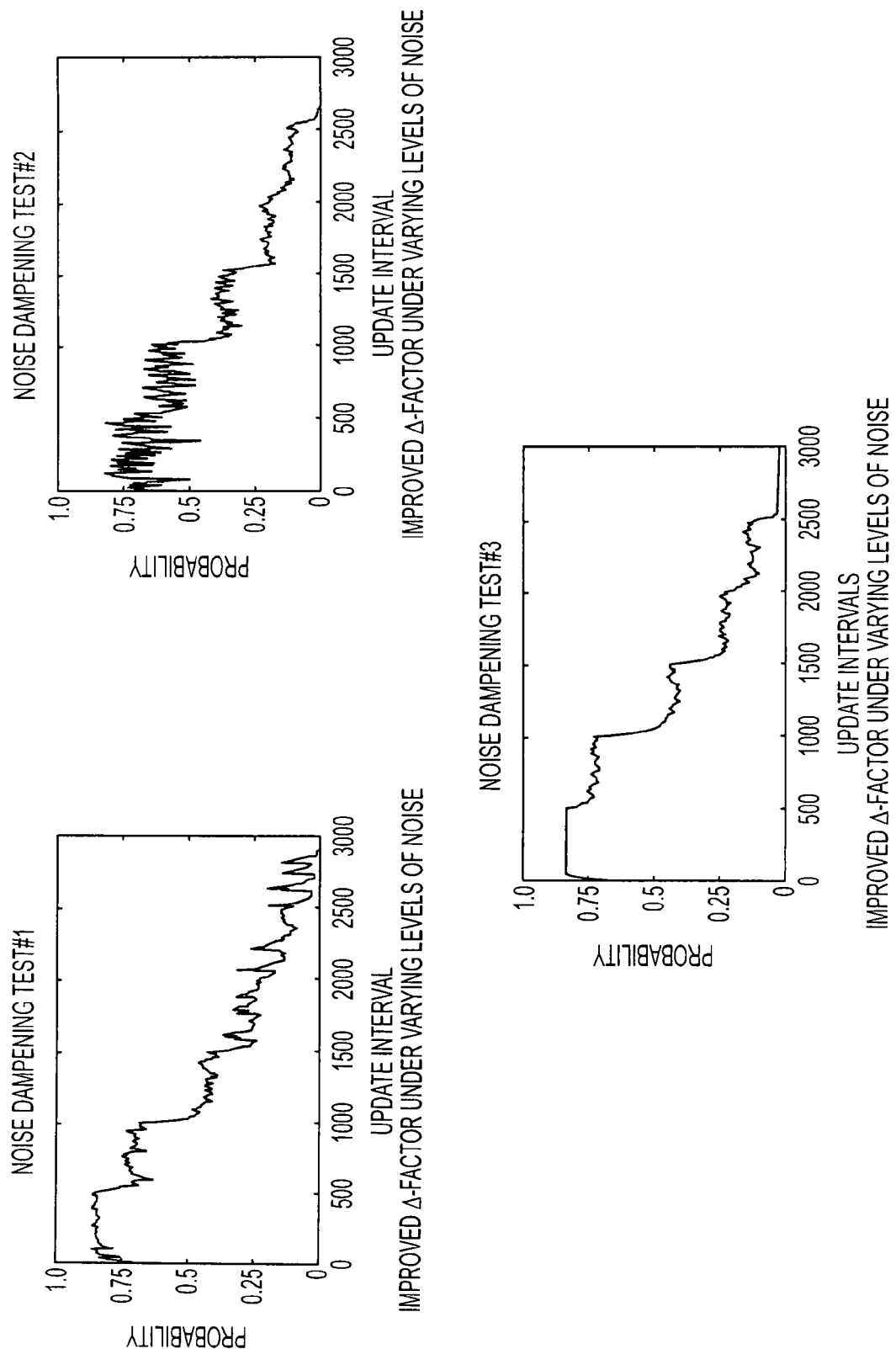

FIG. 12 demonstrates the results of the new $\Delta$-factor definition applied to varying levels of noise using an equal contribution of both original terms. The variability in the third test is significantly reduced compared to the same test that was applied to the linear definition while still maintaining the immediate transition from one behavior to another when such a move is justified. The first and second tests show considerable resistance to large amounts of additional noise which occurs in the datasets.

6. Example Computer Implementation

Figure 13:
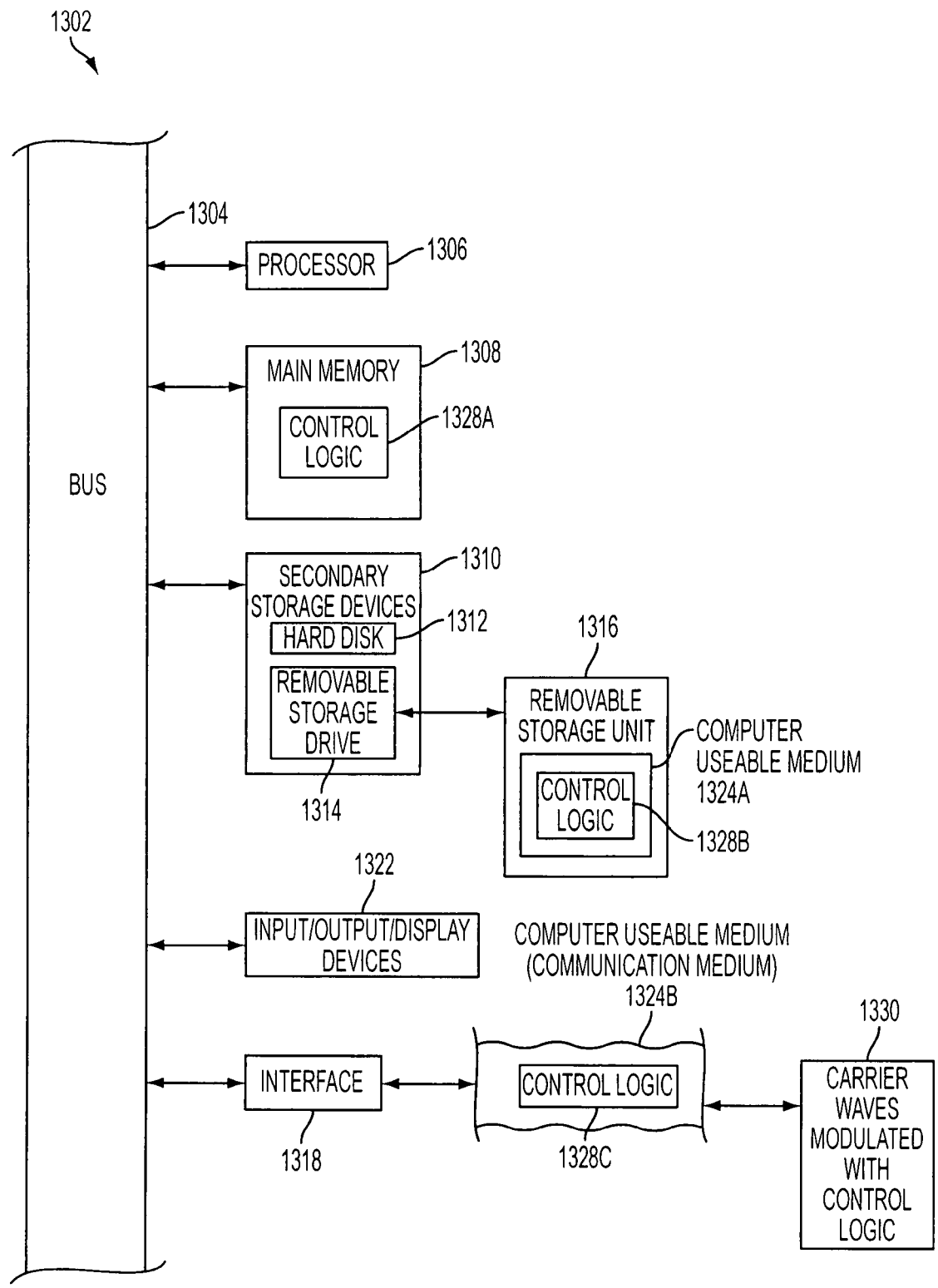
FIG. 13 illustrates an example computer useful for implementing components of the invention.

In an embodiment of the present invention, the system and components of the present invention described herein are implemented using well known computers, such as computer 1302 shown in FIG. 13. For example, server 104, web sites 108 and client 106 can be implemented using computers 1302.

The computer 1302 can be any commercially available and well known computer capable of performing the functions described herein, such as computers, personal data assistants, as well as any other data processing device available from International Business Machines, Apple, Sun, HP, Dell, Compaq, Digital, Cray, etc.

The computer 1302 includes one or more processors (also called central processing units, or CPUs), such as a processor 1306. The processor 1306 is connected to a communication bus 1304.

The computer 1302 also includes a main or primary memory 1308, such as random access memory (RAM). The primary memory 1308 has stored therein control logic 1328A (computer software), and data.

The computer 1302 also includes one or more secondary storage devices 1310. The secondary storage devices 1310 include, for example, a hard disk drive 1312 and/or a removable storage device or drive 1314, as well as other types of storage devices, such as memory cards and memory sticks. The removable storage drive 1314 represents a floppy disk drive, a magnetic tape drive, a compact disk drive, an optical storage device, tape backup, etc.

The removable storage drive 1314 interacts with a removable storage unit 1316. The removable storage unit 1316 includes a computer useable or readable storage medium 1324 having stored therein computer software 1328B (control logic) and/or data. Removable storage unit 1316 represents a floppy disk, magnetic tape, compact disk, DVD, optical storage disk, or any other computer data storage device. The removable storage drive 1314 reads from and/or writes to the removable storage unit 1316 in a well known manner.

The computer 1302 also includes input/output/display devices 1322, such as monitors, keyboards, pointing devices, etc.

The computer 1302 further includes a communication or network interface 1318. The network interface 1318 enables the computer 1302 to communicate with remote devices. For example, the network interface 1318 allows the computer 1302 to communicate over communication networks or mediums 1324B (representing a form of a computer useable or readable medium), such as LANs, WANs, the Internet, etc. The network interface 1318 may interface with remote sites or networks via wired or wireless connections.

Control logic 1328C may be transmitted to and from the computer 1302 via the communication medium 1324B. More particularly, the computer 1302 may receive and transmit carrier waves (electromagnetic signals) modulated with control logic 1330 via the communication medium 1324B.

Any apparatus or manufacture comprising a computer useable or readable medium having control logic (software) stored therein is referred to herein as a computer program product or program storage device. This includes, but is not limited to, the computer 1302, the main memory 1308, the secondary storage devices 1310, the removable storage unit 1316 and the carrier waves modulated with control logic 1330. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

6. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of scheduling a sync between a server and a client, comprising:
    tracking user usage of said client to develop usage patterns;
    automatically determining a sync schedule using said usage patterns, wherein said sync schedule is determined based on a sync fitness measure for interval t, wherein the sync fitness measure is based on sync usefulness;
    using the developed usage patterns, determining sync usefulness for the interval t based on:
        a duration of time between the interval t and a next predicted user access time, and
        an estimate of lost usefulness if a sync is not performed at the interval t;
    determining whether the sync fitness measure satisfies a threshold; and
    synchronizing the server and the client during the interval t if the sync fitness measure satisfies the threshold.

2. The method of claim 1, wherein the determining of the sync usefulness comprises, increasing the measure of sync usefulness when the determined duration of time between interval t and the next predicted user access time decreases.

3. The method of claim 1, wherein the determining of the sync usefulness comprises, increasing the sync usefulness as the estimate of lost usefulness at interval t decreases.

4. The method of claim 1, wherein the determining of the sync usefulness comprises subtracting a value corresponding to the estimate of lost usefulness from the duration of time between interval t and the next predicted user access time.

5. The method of claim 1, further comprising:
    using the developed usage patterns, determining a likelihood that a performed synchronization will disturb a user of the client during interval t; and
    determining a sync transparency measure based on the determined likelihood, wherein the determining a sync schedule based on a sync fitness measure for interval t comprises, determining the sync schedule based on the sync fitness measure further based on the determined sync transparency measure.

6. A method of determining whether to synchronize a server and a client in an interval t, comprising:
    generating a sync fitness measure for said interval t, wherein said sync fitness measure is based on at least one of (a) sync transparency; and (b) sync usefulness,
    wherein the sync usefulness measure E1 (t) and a sync transparency measure E2 (t) are determined according to equations:

$$E1(t)=\alpha1\cdot(1-\|t-t1\|/\max(\text{time}))-\alpha2\cdot\Sigma Pu(i) \text{ for } I=t0 \text{ to } t-1$$

$$E2(t)=PH(t)$$

determining whether said sync fitness measure satisfies a threshold; wherein:
    PH (t) is a probability that the client will be inactive at time t,
    PU (i) is a probability that a user will be accessing data in the client at time i;
    max (time) is the number of intervals in a day,
    t1 is the closest next interval of usage of the data by the user, and α1 and α2 are weights; and
    synchronizing said server and said client during said interval t if said sync fitness measure satisfies said threshold.

7. The method of claim 6, wherein the sync fitness measure comprises a weighted sum of E1(t) and E2(t).

8. A method of determining whether to synchronize a server and a client in an interval t, comprising:
    generating a sync fitness measure for said interval t, wherein said sync fitness measure is based on at least one of (a) sync transparency; and (b) sync usefulness,
    wherein the sync usefulness measure E1 (t) and a sync transparency measure E2 (t) are determined according to the equation:

$$E1(t)=\alpha1\cdot(1-\|t-t1\|/\max(\text{time}))-\alpha2\cdot\Sigma Pu(i) \text{ for } I=t0 \text{ to } t-1$$

$$E2(t)=PH(t);$$

determining whether said sync fitness measure satisfies a threshold; wherein:
    PH (t) is a probability that the client will be inactive at time t;
    PU (i) is a probability that a user will be accessing data in the client at time i;
    max (time) is the number of intervals in a day,
    t1 is the closest next interval of usage of the data by the user, and α1 and α2 are weights; and synchronizing said server and said client during said interval t if said sync fitness measure satisfies said threshold.

9. A computer program product comprising a non-transitory computer readable medium having computer program logic recorded thereon for enabling a processor to determine whether to synchronize a server and a client in an interval t, the computer program logic comprising:

generating a sync fitness measure for said interval t, wherein said sync fitness measure is based on a determined sync usefulness, wherein the sync usefulness measure EI (t) is determined according to the equation:

$$E1(t) = \alpha 1 \cdot (1 - \|t - t1\| / \max(\text{time})) - \alpha 2 \cdot \Sigma Pu(i) \text{ for } I = t0 \text{ to } t-1$$

determining whether said sync fitness measure satisfies a threshold; wherein:

PU (i) is a probability that a user will be accessing data in the client at time i;

max (time) is the number of intervals in a day, t1 is the closest next interval of usage of the data by the user, and α1 and α2 are weights; and synchronizing said server and said client during said interval t if said sync fitness measure satisfies said threshold.

* * * * *